United States Patent
Du et al.

(10) Patent No.: US 12,039,892 B2
(45) Date of Patent: Jul. 16, 2024

(54) APPARATUS AND METHOD FOR HARDWARE-BASED DATA ENCRYPTION WITH IMPEDANCE SWITCH

(71) Applicant: Fraunhofer-Gesellschaft zur Förderung der angewandten Forschung e.V., Munich (DE)

(72) Inventors: Nan Du, Chemnitz (DE); Heidemarie Schmidt, Chemnitz (DE); Ramona Ecke, Chemnitz (DE); Stefan Schulz, Chemnitz (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 247 days.

(21) Appl. No.: 17/662,803

(22) Filed: May 10, 2022

(65) Prior Publication Data
US 2022/0270518 A1   Aug. 25, 2022

Related U.S. Application Data

(63) Continuation of application No. PCT/EP2020/081589, filed on Nov. 10, 2020.

(30) Foreign Application Priority Data

Nov. 11, 2019  (DE) .......................... 102019217397.7
Dec. 20, 2019  (DE) .......................... 102019220464.3

(51) Int. Cl.
*G09C 1/00*    (2006.01)
*H04L 9/00*    (2022.01)
(Continued)

(52) U.S. Cl.
CPC .................. *G09C 1/00* (2013.01); *H04L 9/00* (2013.01); *H04L 63/00* (2013.01); *H04L 63/04* (2013.01);
(Continued)

(58) Field of Classification Search
CPC .  G09C 1/00; H04W 12/03; H04L 9/00; H04L 63/00; H04L 63/04; H04L 63/0428
See application file for complete search history.

(56) References Cited

U.S. PATENT DOCUMENTS 9,812,640 B2   11/2017  You et al.
2015/0364682 A1  12/2015  You et al.
(Continued)

FOREIGN PATENT DOCUMENTS

DE   102018112605 A1   11/2019

OTHER PUBLICATIONS

Wikipedia, Physical unclonable function, https://en.wikipedia.org/w/index.php?title=Physical_unclonable_function&oldid=914158829 (Year: 2019).*
(Continued)

*Primary Examiner* — Robert B Leung
*Assistant Examiner* — Howard H. Louie
(74) *Attorney, Agent, or Firm* — PERKINS COIE LLP; Michael A. Glenn

(57) ABSTRACT

A decoder for decoding to obtain a binary data sequence is provided. The decoder includes a first inductance element, a first state element, a second inductance element, a second state element, an inductance sequence generator, a first comparison unit and a second comparison unit. The inductance sequence generator is configured to generate an inductance sequence including a plurality of inductance values and to adjust each inductance value of the plurality of inductance values of the inductance sequence at the first inductance element and at the second inductance element.

22 Claims, 11 Drawing Sheets

(51) Int. Cl.
*H04L 9/40* (2022.01)
*H04W 12/03* (2021.01)

(52) U.S. Cl.
CPC ......... *H04L 63/0428* (2013.01); *H04W 12/03* (2021.01)

(56) References Cited

U.S. PATENT DOCUMENTS

| | | | |
|---|---|---|---|
| 2018/0262230 A1* | 9/2018 | Jain | H04L 9/002 |
| 2019/0311157 A1* | 10/2019 | Immler | G06F 21/87 |
| 2021/0035924 A1* | 2/2021 | Best | H01L 23/576 |
| 2021/0305961 A1 | 9/2021 | Schmidt et al. | |

OTHER PUBLICATIONS

Ascoli, Alon, et al., "BiFeO3 memristor-based encryption of medical data", IEEE International Symposium on Circuits and Systems (ISCAS)—May 22-25, 2016—Montreal, QC, Canada, 2016, S. 1602-1605.

Cisco, "The Zettabyte Era: Trends and Analysis", White Paper, (2014); 24 pages.

Du, Nan, "Beyond "More than Moore"", Novel applications of BiFeO 3 (BFO)-based non-volatile resistive switches, Aug. 25, 2015, XP055382807.

Du, Nan, et al., "Novel implementation of memristive systems for data encryption and obfuscation", Journal of Applied Physics, American Institute of Physics, US, vol. 115, 2014, No. 12, Mar. 28, 2014, XP012183617.

* cited by examiner

APPARATUS AND METHOD FOR HARDWARE-BASED DATA ENCRYPTION WITH IMPEDANCE SWITCH

CROSS-REFERENCE TO RELATED APPLICATIONS

This application is a continuation of copending International Application No. PCT/EP2020/081589, filed Nov. 10, 2020, which is incorporated herein by reference in its entirety, and additionally claims priority from German Applications Nos. 102019217397.7, filed Nov. 11, 2019, and 10 2019 220 464.3, filed Dec. 20, 2019, which are all incorporated herein by reference in their entirety.

The application relates to hardware-based encryption of data with an electronic circuit, and, in particular, to an apparatus and a method for hardware-based data encryption with impedance switch, wherein the circuit can be configured, for example, to include at least one non-volatile, reconfigurable switch and at least one of the electronic devices resistor, inductance or capacitance. Further, the application relates to the structure of the electronic circuit and a method for encrypting the data.

BACKGROUND OF THE INVENTION

In the increasingly digitalized and networked world, the specific usage of modern information and communication technologies represents the decisive key to economic success. Rapidly increasing amounts of data (2018: 1.6 zettabytes ($1.6 \cdot 10^{21}$ bytes) [Cisco2014]) have to be encrypted for a secure data infrastructure.

Digital encryption technologies offer a good way to protect data. Up to now, software-based encryption has been the standard solution for data encryption. Currently, software programs can be used to encrypt individual files or folders or even the entire hard disk (as part of full disk encryption). A large number of software solutions from various providers are already available on the market for this purpose. However, the disadvantages of software-based full disk encryption are considerable time and computing requirements and the associated increase in energy consumption. A software-based method is no longer practicable in the future given the expected rapid increase in the amounts of data that have to be processed.

Hardware-based encryption solves problems of software-based encryption and enables the use of novel encryption concepts and protocols.

In hardware-based cryptography, the hardware components (encryption hardware) encrypt the data or exchanged signals directly on the data carrier in real time without the use of additional software, thus protecting them from unwanted access. If the storage medium is physically lost, the stored data are still secure. In real-time operation, the use of hardware cryptography allows longer key lengths than before. Hardware encryption therefore offers considerable security advantages and at the same time reduces the system load, since no processor processing power has to be used for encryption.

A known solution for storing keys for cryptographic applications is the so-called physical unclonable function (PUF).

Like a fingerprint, the PUF is an individual feature bound to a physical object (encryption hardware). Today, PUFs are used to identify members of integrated circuits or as a substitute for storing keys for cryptographic applications.

The challenge in realizing a PUF is to find a physical object (encryption hardware) comprising an unpredictable, individual feature.

Due to the stochastic behavior of memristors, memristors are ideal potential candidates for the realization of encryption hardware. Memristors are novel microelectronic devices whose electrical resistance can be selectively adjusted as a function of current flow and is then maintained in a non-volatile manner without any external voltage applied—hence the made-up word of memory and resistor. Memristors are expected to be resistant to noise and environmental influences due to their non-volatile behavior. At the same time, however, the individual features of memristors depend strongly and uncontrollably on the manufacturing process and are thus unpredictable.

Various protocols have already been developed for PUFs in different applications. For example, the $BiFeO_3$ (BFO) platform (BFO/$BiFeO_3$=bismuth iron oxide) opens up the possibility of using the BFO platform as a PUF in hardware-based cryptography due to the memristive properties of BFO. For example, one protocol describes how the non-volatile, nonlinear resistance change of BFO memristors will be used to generate higher harmonics that can be used to easily cipher and decipher digital data sets [U.S. Pat. No. 9,812,640 B2], [Du2014]. These higher harmonics can be transmitted wirelessly to the receiver and can be decoded again by the receiver using hardware-based cryptography. Minimizing the autocorrelation of these higher harmonics was basically shown using a BFO-based cryptography [Du2014]. The transmitted data set can only be decoded if the identical BFO memristor and the identical random number generator as well as the identical cryptography circuit are available, which the transmitter has used to encrypt the data. Further, it has been shown how the BFO-based memristor can be used to protect personal data in medicine [Ascoli2016].

The characteristic of the protocol that the transmitted data set is only decoded if the identical BFO memristor and the identical random number generator as well as the identical cryptography circuit are available, which the transmitter has used to encrypt the data, represents a security gap. This security gap could not be closed so far.

SUMMARY

According to an embodiment, a decoder for decoding to obtain a binary data sequence may have: a first inductance element including an adjustable inductance, a first state element configured to include a first impedance when the first inductance element includes an inductance with a first inductance value and to include a second impedance that differs from the first impedance when the first inductance element includes an inductance with a second inductance value that differs from the first inductance value, a second inductance element including an adjustable inductance, a second state element configured to include a third impedance that differs from the first impedance when the second inductance element includes an inductance with the first inductance value and to include a fourth impedance that differs from the second impedance and from the third impedance when the second inductance element includes an inductance with the second inductance value, an inductance sequence generator configured to generate an inductance sequence including a plurality of inductance values and to adjust each inductance value of the plurality of inductance values of the inductance sequence at the first inductance element and at the second inductance element, a first comparison unit configured to perform a first comparison after a current inductance value of the plurality of inductance values of the inductance sequence has been adjusted at the first inductance element, wherein the first comparison depends on a received impedance value and on an impedance that the first state element includes when the current inductance value has been adjusted at the first inductance element, a second comparison unit configured to perform a second comparison after the current inductance value of the plurality of inductance values of the inductance sequence has been adjusted at the second inductance element, wherein the second comparison depends on the received impedance value and on an impedance that the second state element includes when the current inductance value has been adjusted at the second inductance element, wherein the decoder is configured to output no binary value of the binary data sequence as a result of the evaluation of the received impedance value when it results from the received impedance value that no binary value of the binary data sequence is encoded with the received impedance value, wherein, when it results from the received impedance value that a binary value of the binary data sequence is encoded with the received impedance value, the decoder is configured to output a first binary value as a binary value of the binary data sequence as a result of the evaluation of the received impedance value when the first comparison provides a match, wherein, when it results from the received impedance value that a binary value of the binary data sequence is encoded with the received impedance value, the decoder is configured to output, as the result of the evaluation of the received impedance, a second binary value as said one binary value of the binary data sequence value that differs from the first binary value when the first comparison does not provide a match but when the second comparison does provide a match.

According to another embodiment, an encoder for encoding a binary data sequence may have: an inductance element including an adjustable inductance, a switchable element configured to be switched to a first state or to a second state, wherein, when the inductance element includes an inductance with a first inductance value, the switchable element includes a first impedance when the switchable element is switched to the first state, and wherein, when the inductance element includes the inductance with the first inductance value, the switchable element includes a second impedance that differs from the first impedance when the switchable element is switched to the second state, an inductance sequence generator configured to generate an inductance sequence including a plurality of inductance values and to adjust every inductance value of the plurality of inductance values of the inductance sequence at the inductance element, a control unit, wherein the control unit is configured to switch the switchable element to the first state or to the second state in dependence on a binary value of the binary data sequence when the impedance that the switchable element includes is within a predefined impedance range after one of the inductance values of the plurality of inductance values of the inductance sequence has been adjusted, and wherein the control unit is configured to not switch the switchable element and to maintain the same in the first or second state when the impedance that the switchable element includes is within the predefined impedance range after said one of the inductance values of the plurality of inductance values of the inductance sequence has been adjusted.

According to another embodiment, a system may have: an inventive encoder for encoding a binary data sequence, an inventive decoder, wherein the encoder is configured to encode a binary data sequence and to transmit the same in encoded form to the inventive decoder and wherein the inventive decoder is configured to decode the encoded form of the binary data sequence to decode the binary data sequence.

According to another embodiment, a method for decoding to obtain a binary data sequence may have the steps of: generating an inductance sequence including a plurality of inductance values by an inductance sequence generator, adjusting each inductance value of the plurality of inductance values of the inductance sequence at a first inductance element and at a second inductance element, wherein the first inductance element includes an adjustable inductance and wherein the second inductance element includes an adjustable inductance, performing a first comparison by a first comparison unit after a current inductance value of the plurality of inductance values of the inductance sequence has been adjusted at the first inductance element, wherein the first comparison depends on a received impedance value and on an impedance that the first state element includes when the current inductance value has been adjusted at the first inductance element, performing a second comparison by a second comparison unit after the current inductance value of the plurality of inductance values of the inductance sequence has been adjusted at the second inductance element, wherein the second comparison depends on the received impedance value and on an impedance that the second state element includes when the current inductance value has been adjusted at the second inductance element, as a result of the evaluation of the received impedance value, outputting no binary value of the binary data sequence when it results from the received impedance value that no binary value of the binary data sequence is encoded with the received impedance value, when it results from the received impedance value that a binary value of the binary data sequence is encoded with the received impedance value, as a result of the evaluation of the received impedance value, outputting a first binary value as a binary value of the binary data sequence when the first comparison provides a match, when it results from the received impedance value that a binary value of the binary data sequence is encoded with the received impedance value, as the result of the evaluation of the received impedance value, outputting a second binary value as said one binary value of the binary data sequence that differs from the first binary value when the first comparison does not provide a match but when the second comparison does provide a match, wherein the first state element is configured to include a first impedance when the first inductance element includes an inductance with the first inductance value, and to include a second impedance that differs from the first impedance when the first inductance element includes an inductance with a second inductance value that differs from the second value, and wherein the second state element is configured to include a third impedance that differs from the first impedance when the second inductance element includes an inductance with the first inductance value and to include a fourth impedance that differs from the second impedance and from the third impedance when the second inductance element includes an inductance with the second inductance value.

According to another embodiment, a method for encoding a binary data sequence may have the steps of: generating an inductance sequence including a plurality of inductance values by an inductance sequence generator, adjusting each inductance value of the plurality of inductance values of the inductance sequence at an inductance element, wherein the inductance element includes an adjustable inductance, wherein, when the inductance element includes an inductance with the first inductance value, a switchable element includes a first impedance when the switchable element is switched to a first state and wherein, when the inductance element includes the inductance with the first inductance value, the switchable element includes a second impedance that differs from the first impedance when the switchable element is switched to a second state, wherein, when the impedance that the switchable element includes is within a predefined impedance range after one of the inductance values of the plurality of inductance values of the inductance sequence has been adjusted, the switchable element is switched to the first state or to the second state by the control unit in dependence on a binary value of the binary data sequence and wherein the switchable element is not switched by the control unit and is maintained in the first or in the second state when the impedance that the switchable element includes is within the predefined impedance range after the one of the inductance values of the plurality of inductance values of the inductance sequence has been adjusted.

According to another embodiment, a method for decoding and encoding may have: an inventive method for encoding a binary data sequence, an inventive method for decoding, wherein a binary data sequence is encoded according to the method for encoding to obtain an encoded form of the binary data sequence and wherein the encoded form of the binary data sequence is decoded according to the inventive method for decoding to decode the binary data sequence.

Another embodiment may have a non-transitory digital storage medium having a computer program stored thereon to perform any of the inventive methods when said computer program is run by a computer.

A decoder for decoding to obtain a binary data sequence is provided. The decoder includes a first inductance element, a first state element, a second inductance element, a second state element, an inductance sequence generator, a first comparison unit and a second comparison unit. The inductance sequence generator is configured to generate an inductance sequence including a plurality of inductance values and to adjust each inductance value of the plurality of inductance values of the inductance sequence at the first inductance element and at the second inductance element. The first comparison unit is configured to perform a first comparison depending on a received impedance value and depending on an impedance that the first state element comprises when the current inductance value has been adjusted at the first inductance element. The second comparison unit is configured to perform a second comparison that depends on the received impedance value and depends on an impedance that the second state element comprises when the current inductance value has been adjusted at the second inductance element.

Specifically, a decoder is provided for decoding to obtain a binary data sequence.

The decoder includes a first inductance element comprising an adjustable inductance.

Further, the decoder includes a first state element configured to comprise a first impedance when the first inductance element comprises an inductance with a first inductance value, and to comprise a second impedance that differs from the first impedance when the first inductance element comprises an inductance with a second inductance value that differs from the first inductance value.

Further, the decoder includes a second inductance element comprising an adjustable inductance.

Further, the decoder includes a second state element configured to comprise a third impedance that differs from the first impedance when the second inductance element comprises an inductance with the first inductance value, and to comprise a fourth impedance that differs from the second impedance and from the third impedance when the second inductance element comprises an inductance with the second inductance value.

Further, the decoder includes an inductance sequence generator configured to generate an inductance sequence including a plurality of inductance values and to adjust each inductance value of the plurality of inductance values of the inductance sequence at the first inductance element and at the second inductance element.

Further, the decoder includes a first comparison unit configured to perform a first comparison after a current inductance value of the plurality of inductance values of the inductance sequence has been adjusted at the first inductance element, wherein the first comparison depends on a received impedance value and depends on an impedance that the first state element comprises when the current inductance value has been adjusted at the first inductance element.

Further, the decoder includes a second comparison unit configured to perform a second comparison after the current inductance value of the plurality of inductance values of the inductance sequence has been adjusted at the second inductance element, wherein the second comparison depends on the received impedance value and depends on an impedance that the second state element comprises when the current inductance value has been adjusted at the second inductance element.

The decoder is configured to output no binary value of the binary data sequence as a result of the evaluation of the received impedance value when it results from the received impedance value that no binary value of the binary data sequence is encoded with the received impedance value.

Further, when it results from the received impedance value that a binary value of the binary data sequence is encoded with the received impedance value, the decoder is configured to output a first binary value as a binary value of the binary data sequence as a result of the evaluation of the received impedance value when the first comparison provides a match.

Further, when it results from the received impedance value that a binary value of the binary data sequence is encoded with the received impedance value, the decoder is configured to output, as the result of evaluating the received impedance value, a second binary value as said one binary value of the binary data sequence that differs from the first binary value when the first comparison does not provide a match but when the second comparison does provide a match.

Further, an encoder for encoding a binary data sequence is provided.

The encoder includes an inductance element comprising an adjustable inductance.

Further, the encoder includes a switchable element configured to be switched to a first state or to a second state, wherein, when the inductance element comprises an inductance with a first inductance value, the switchable element comprises a first impedance when the switchable element is switched to the first state, and wherein, when the inductance element comprises the inductance with the first inductance value, the switchable element comprises a second impedance that differs from the first impedance when the switchable element is switched to the second state.

Further, the encoder includes an inductance sequence generator configured to generate an inductance sequence including a plurality of inductance values and to adjust each inductance value of the plurality of inductance values of the inductance sequence at the inductance element.

Further, the encoder includes a control unit.

The control unit is configured to switch the switchable element to the first state or the second state in dependence on a binary value of the binary data sequence, when the impedance that the switchable element comprises is within a predefined impedance range after one of the inductance values of the plurality of inductance values of the inductance sequence has been adjusted.

Further, the control unit is configured to not switch the switchable element and to maintain the same in the first or second state when the impedance that the switchable element comprises is within the predefined impedance range after said one of the inductance values of the plurality of inductance values of the inductance sequence has been adjusted.

Further, a system is provided. The system includes the encoder described above and the decoder described above. The encoder is configured to encode a binary data sequence and transmit the same in encoded form to the decoder. The decoder is configured to decode the encoded form of the binary data sequence in order to decode the binary data sequence.

Further, a method for decoding to obtain a binary data sequence is provided. The method includes:
generating an inductance sequence including a plurality of inductance values by an inductance sequence generator,
adjusting each inductance value of the plurality of inductance values of the inductance sequence at a first inductance element and at a second inductance element, wherein the first inductance element comprises an adjustable inductance and wherein the second inductance element comprises an adjustable inductance,
performing a first comparison by a first comparison unit after a current inductance value of the plurality of inductance values of the inductance sequence has been adjusted at the first inductance element, wherein the first comparison depends on a received impedance value and depends on an impedance that a first state element comprises when the current inductance value has been adjusted at the first inductance element,
performing a second comparison by a second comparison unit after the current inductance value of the plurality of inductance values of the inductance sequence has been adjusted at the second inductance element, wherein the second comparison depends on the received impedance value and on an impedance that a second state element comprises when the current inductance value has been adjusted at the second inductance element,
as a result of the evaluation of the received impedance value, outputting no binary value of the binary data sequence when it results from the received impedance value that no binary value of the binary data sequence is encoded with the received impedance value.
when it results from the received impedance value that a binary value of the binary data sequence is encoded with the received impedance value, as a result of the evaluation of the received impedance value, outputting a first binary value as a binary value of the binary data sequence when the first comparison provides a match, and
when it results from the received impedance value that a binary value of the binary data sequence is encoded with the received impedance value, as the result of the evaluation of the received impedance value, outputting a second binary value as said one binary value of the binary data sequence that differs from the first binary value when the first comparison does not provide a match but when the second comparison does provide a match.

In this regard, the first state element is configured to comprise a first impedance when the first inductance element comprises an inductance with a first inductance value, and to comprise a second impedance that differs from the first impedance when the first inductance element comprises an inductance with a second inductance value that differs from the first inductance value. Further, when the second inductance element comprise an inductance with the first inductance value, the second state element is configured to have a third impedance that differs from the first impedance, and when the second inductance element has an inductance with the second inductance value, the same is configured to comprise a fourth impedance that differs from the second impedance and from the third impedance.

Further, a method for encoding a binary data sequence is provided. The method includes:
generating an inductance sequence including a plurality of inductance values by an inductance sequence generator.
adjusting each inductance value of the plurality of inductance values of the inductance sequence at an inductance element, wherein the inductance element comprises the adjustable inductance, wherein, when the inductance element comprises the inductance with the first inductance value, a switchable element comprises a first impedance when the switchable element is switched to a first state, and wherein, when the inductance element comprises the inductance with the first inductance value, the switchable element comprises a second impedance that differs from the first impedance when the switchable element is switched to a second state.

Here, when the impedance that a switchable element comprises is within a predefined impedance range after one of the inductance values of the plurality of inductance values of the inductance sequence has been adjusted, the switchable element is switched to the first state or the second state by the control unit in dependence on a binary value of the binary data sequence. Further, when the impedance that the switchable element comprises is within the predefined impedance range after the one of the inductance values of the plurality of inductance values of the inductance sequence has been adjusted, the switchable element is not switched by the control unit and is maintained in the first state or the second state.

Further, a method for decoding and encoding is provided. The method includes the encoding method described above and the decoding method described above. A binary data sequence is encoded in the method for encoding to obtain an encoded form of the binary data sequence. Further, the encoded form of the binary data sequence is decoded according to the method for decoding to decode the binary data sequence.

Further, computer programs having a program code for performing any of the methods described above are provided.

BRIEF DESCRIPTION OF THE DRAWINGS

Embodiments of the present invention will be detailed subsequently referring to the appended drawings, in which.

DETAILED DESCRIPTION OF THE INVENTION

Embodiments describe a memristor-based data encryption using a new encryption hardware in an electronic circuit for realizing a protocol using a random number generator for data encryption and the same random number generator for data decryption.

Embodiments provide a new electronic circuit with a mempedance-based PUF that stochastically encrypts and deterministically decrypts data. Compared to existing electronic circuits with a memristor-based PUF in conventional technology that stochastically encrypts and deterministically decrypts data, the mempedance-based PUF has the advantage that the power consumption during data encryption with the mempedance-based PUF is significantly lower than with the memristor-based PUF.

Further, embodiments provide a protocol describing how to use the nonvolatile, nonlinear impedance change of YMnO3(YMO) memristors to generate complex impedance data that can be used to easily cipher and decipher digital data sets.

In addition, an electronic circuit (FIG. 6) having a mempedance $M_z$, which shows an impedance change after a write voltage pulse is applied, and an electronic device L, which comprises an inductance, are provided.

Figure 7:
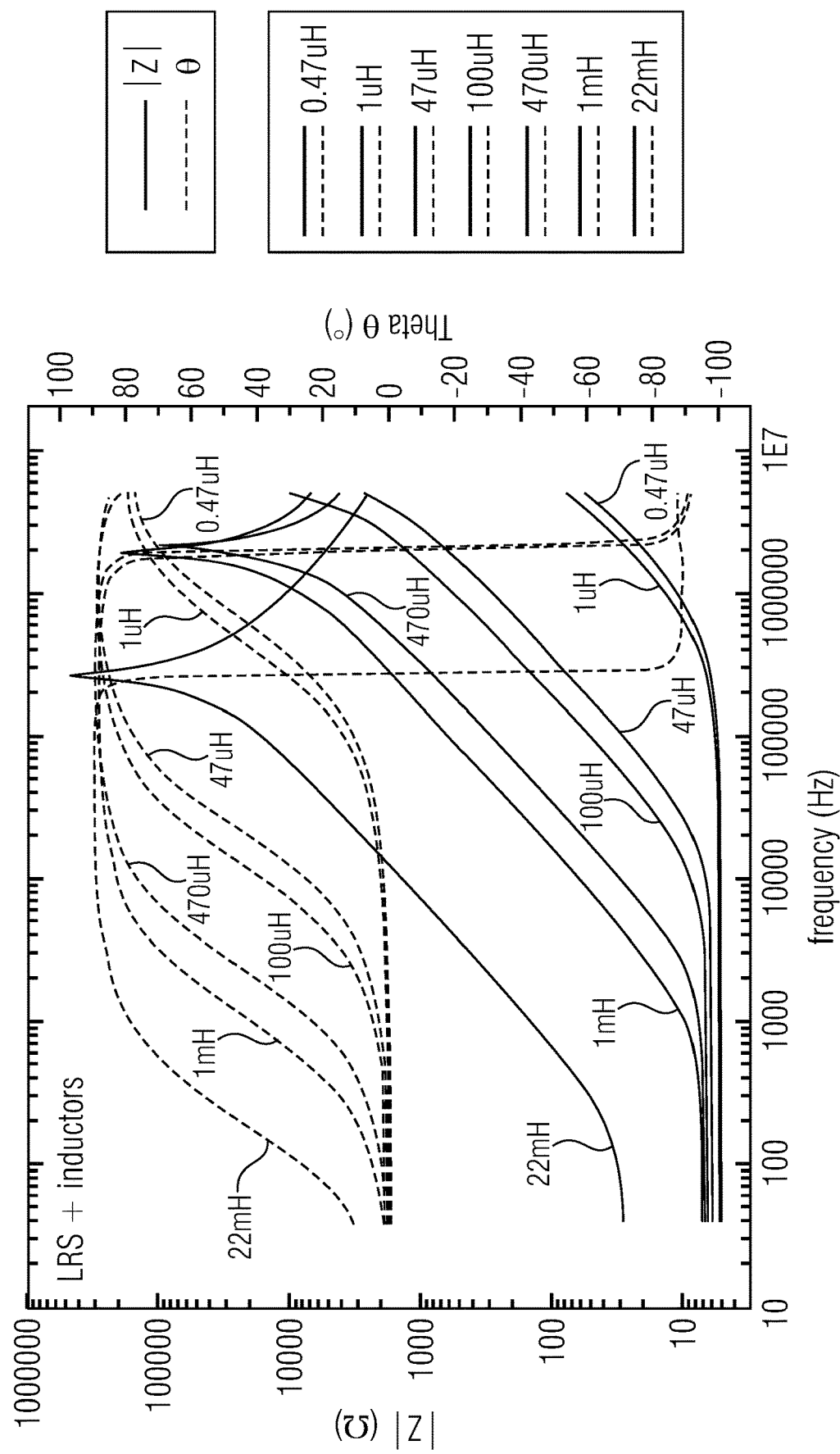
FIG. 7 shows the impedance and theta θ measured in the LRS state.
Figure 8:
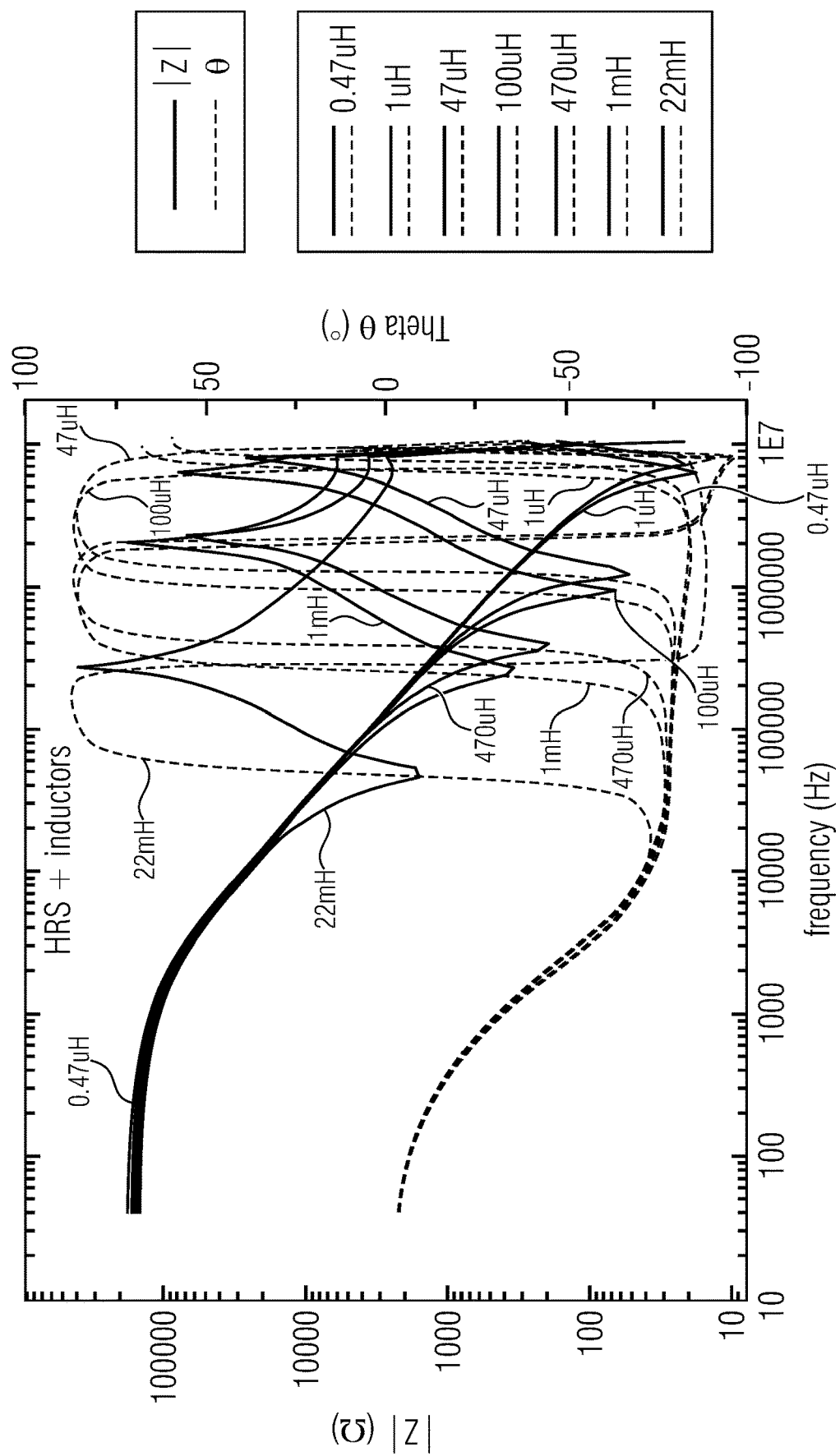
FIG. 8 shows the impedance and theta θ measured in the HRS state.

The impedance data (|Z|, theta θ) of the electronic circuit depend on whether the mempedance MZ is in a low resistance state (LRS) (FIG. 7) with a dominant inductive portion or in a high resistance state (HRS) with a dominant capacitive portion (FIG. 8).

In both the LRS (FIG. 7) and the HRS (FIG. 8), the resonant frequency shifts to lower frequencies as the inductance of the electronic device L increases.

Figure 9:
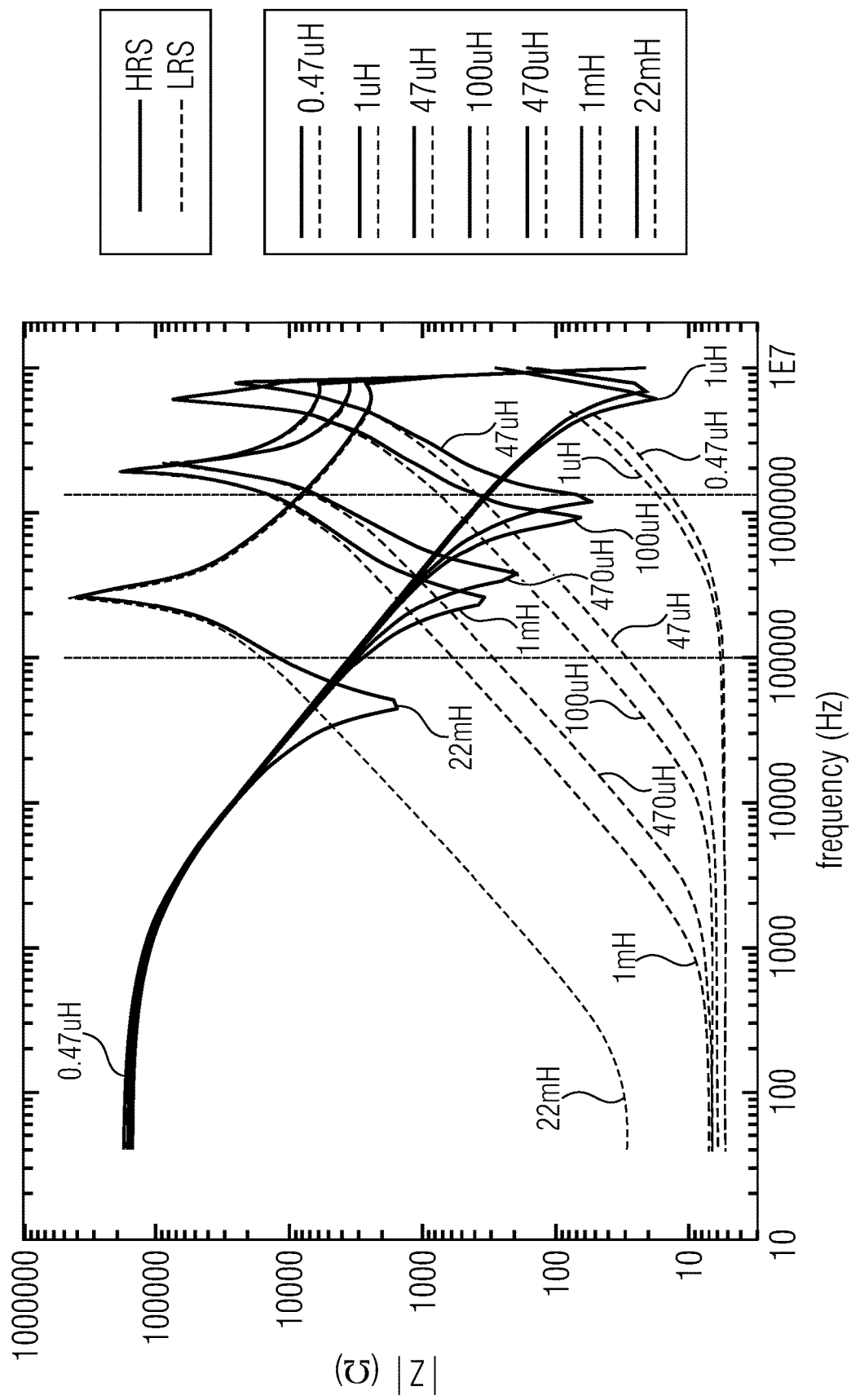
FIG. 9 shows the impedance in the LRS state and in the HRS state with external inductances.
Figure 10:
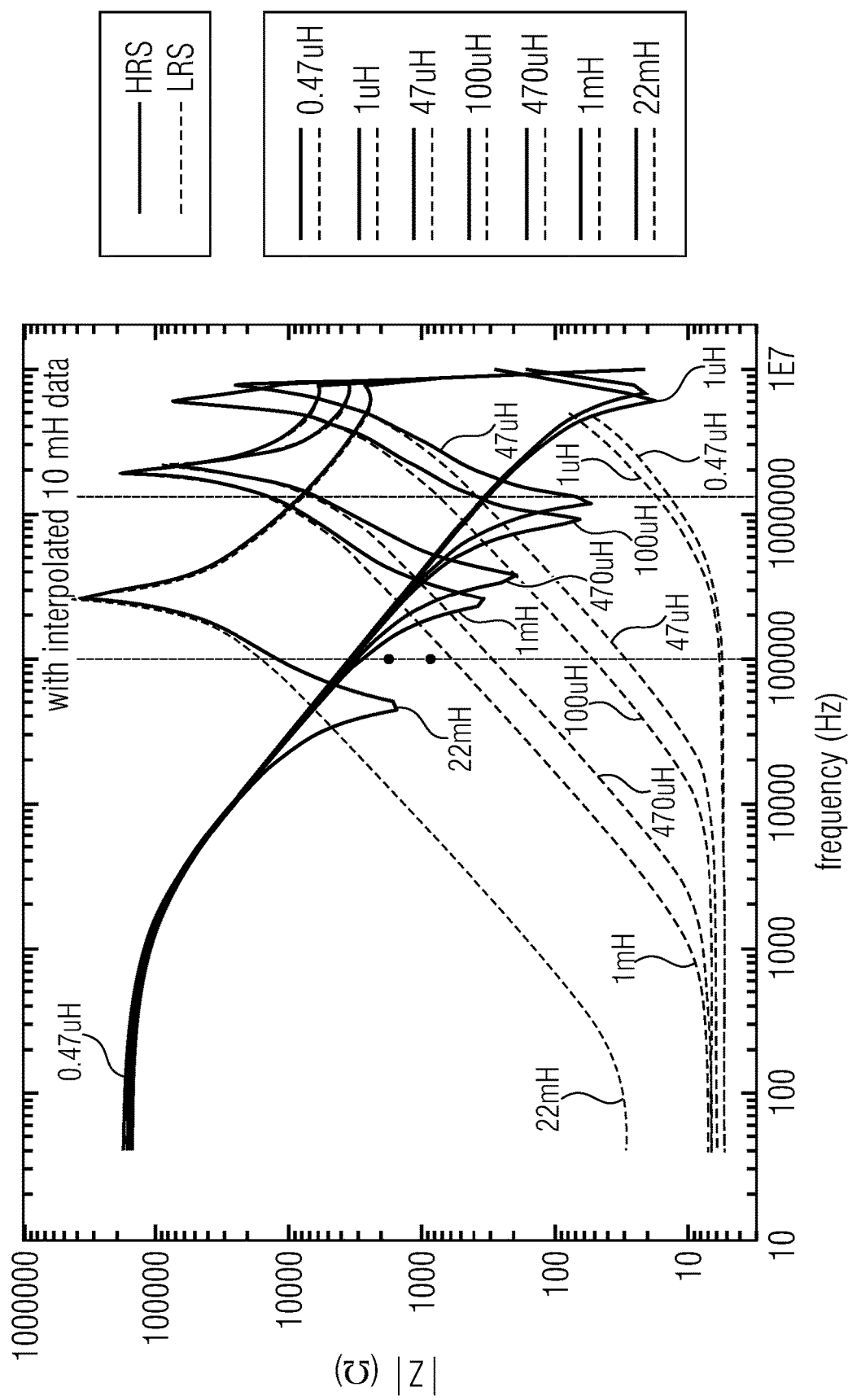
FIG. 10 shows the impedance in the LRS state and in the HRS state with external inductances, wherein the interpolated 10 mH data points are indicated.
Figure 11:
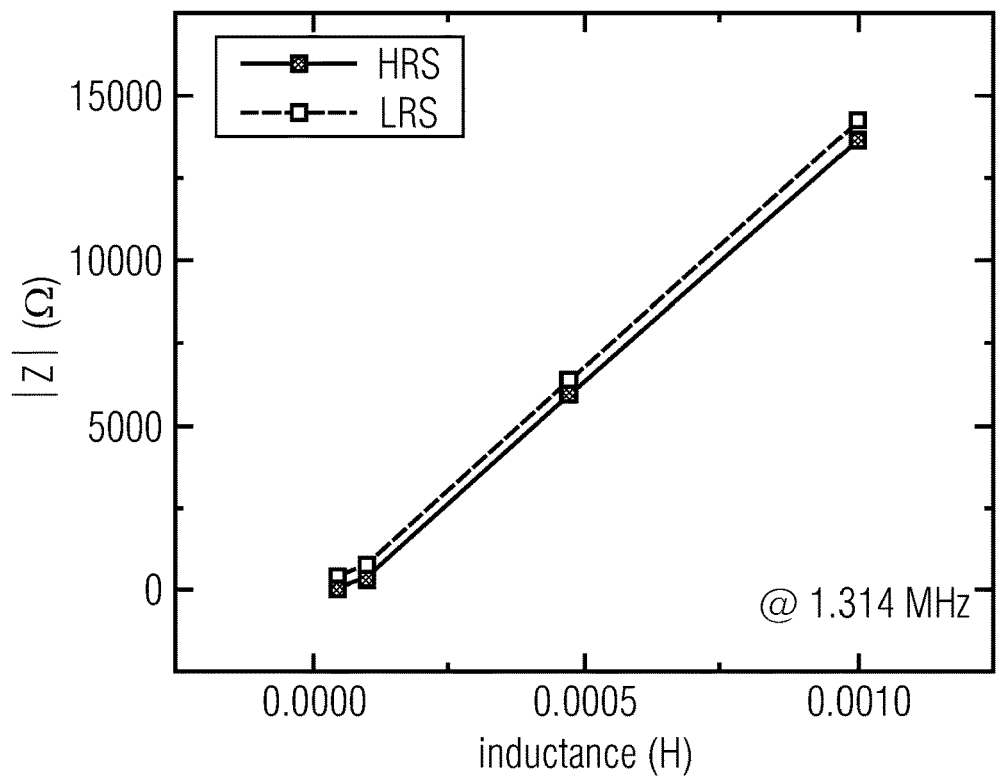
FIG. 11 shows the impedance data for different inductances at 1,314 MHz.

The impedance data of the electronic circuit (FIG. 6) with the YMO impedance in the LRS and HRS differ significantly in the frequency range below the resonant frequency, as shown for |Z| in FIG. 9 and FIG. 10.

As an example, the frequencies 1,314 MHz (FIG. 12) and 100 kHz (FIG. 14) can be considered and it shows that |Z| increases linearly with the inductance L of the electronic device (FIG. 11, FIG. 12, FIG. 13, FIG. 14).

Figure 5:
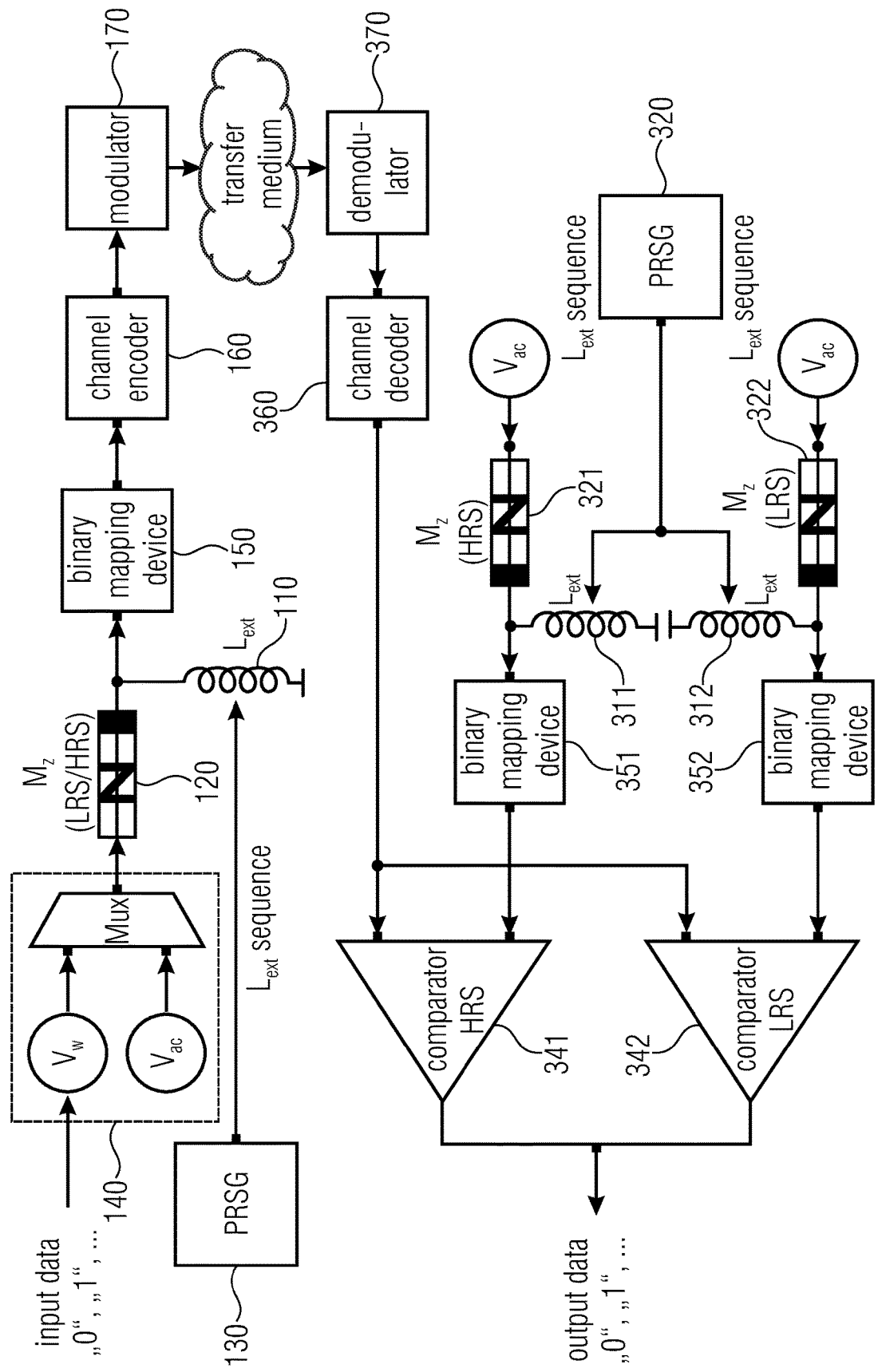
FIG. 5 shows a system according to an embodiment, which is a memimpedance-based source encoding and decoding system according to an embodiment.

A circuit for realizing the corresponding protocol is shown in FIG. 5.

The transmitted data set can only be decoded when the identical YMO-mempedance in the LRS and in the HRS and the identical random number generator are available, which the transmitter has used to encode the data.

An important feature of data encryption is, when the inductance L of the electronic device in series with the mempedance in LRS from the inductance range LRS and the inductance L of the electronic device in series with the mempedance in HRS from the inductance range HRS are appropriately selected, |Z| lie in the same range (FIG. 12 and FIG. 14) and are indistinguishable. Thus, the data encoded as impedance are indistinguishable and secure from attack during transmission.

Figure 6:
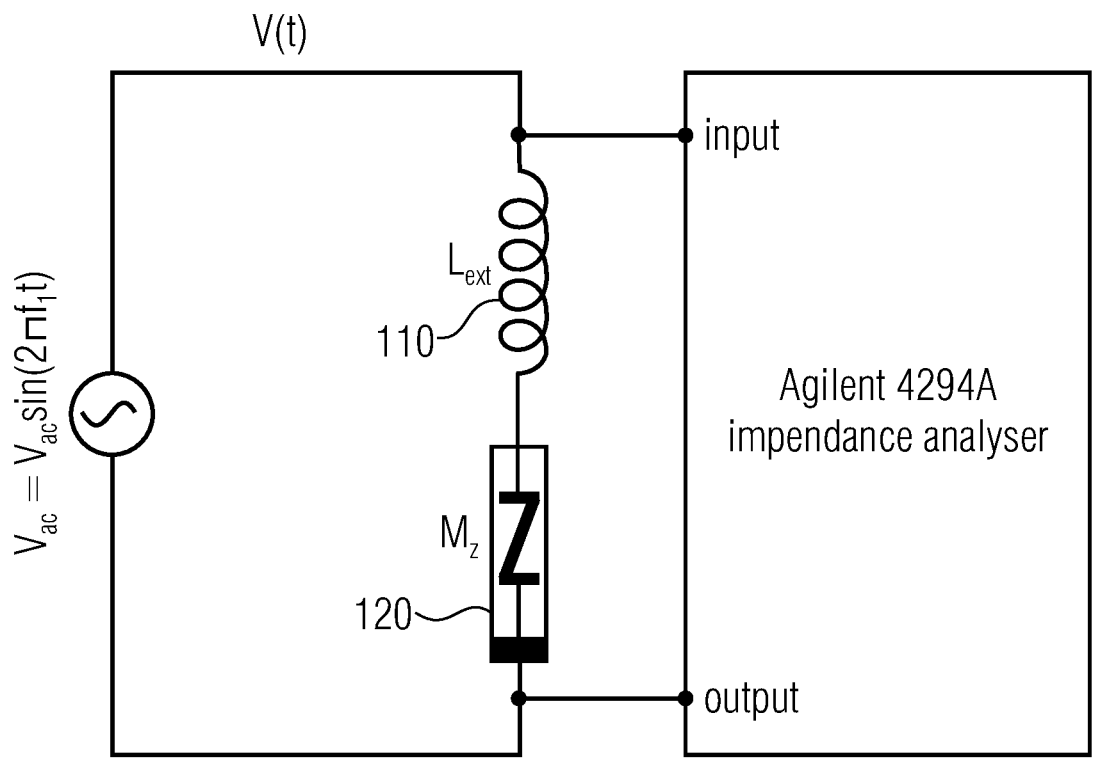
FIG. 6 shows a measurement circuit comprising a memimpedance and an external inductance.

Embodiments of the invention are best illustrated with reference to FIG. 5 and FIG. 6 together with FIG. 12.

FIG. 5 shows a so-called mempedance device $M_z$ 120, 321, 322. Two different states can be adjusted at the specific mempedance device $M_z$ 120 by means of an applied voltage $V_w$.

If, for example, a voltage corresponding to a value of "0" is applied as the voltage $V_w$, the LRS state is adjusted at the mempedance device 120. If, on the other hand, a voltage corresponding to a value of "1" is applied as the voltage $V_w$, for example, the HRS state is adjusted at the mempedance device 120.

In FIG. 5, there is a PRSG module (Pseudo Random Sequence Generator module) that provides a sequence of inductance values that are adjusted sequentially at an inductance $L_{ext}$.

A characteristic feature of the two states (LRS state or HRS state) of the mempedance device 120 is that for the same current inductance value, the mempedance device 120 has two different resistances. This is shown in the diagram in FIG. 12.

When the mempedance device 120 is in the HRS state, there is an impedance value of approximately 1000Ω at an inductance of 140 µH.

If, on the other hand, the mempedance device 120 is in the LRS state, there is an impedance value of approximately 1350Ω at an inductance of 140 µH.

The inductance sequence generator 130 of FIG. 5 now provides a sequence of inductance values that are adjusted at the inductance 110. Accordingly, the mempedance device 120 comprises corresponding resistances that depend on the adjusted inductance on the one hand, and also on the adjusted state of the mempedance element 120 on the other hand.

A control unit 140 decides whether the impedance value that results from the adjusted inductance value is suitable for secretly decoding a binary value of the input data. In the example of FIG. 12, this is the case when the resulting impedance value is in the range between about 750Ω and about 1080Ω. Then, an attacker cannot decide whether the mempedance element 120 was adjusted to the LRZ state to encode a "0" or whether the mempedance element 120 was adjusted to the HRS state to encode a "1".

Rather, decoding needs an inductance sequence generator of the same configuration as the inductance sequence generator 130 and mempedance elements having the same characteristics as the mempedance element 120.

In FIG. 5, an inductance sequence generator 330 is arranged on the decoder side, which generates the same sequence of inductance values as the inductance sequence generator 130.

Further, the decoder side in FIG. 5 comprises two mempedance elements 321 and 322 that have the same characteristics as the mempedance element 120 on the encoder side.

However, the mempedance element 321 is permanently in the HRS state.

Figure 12:
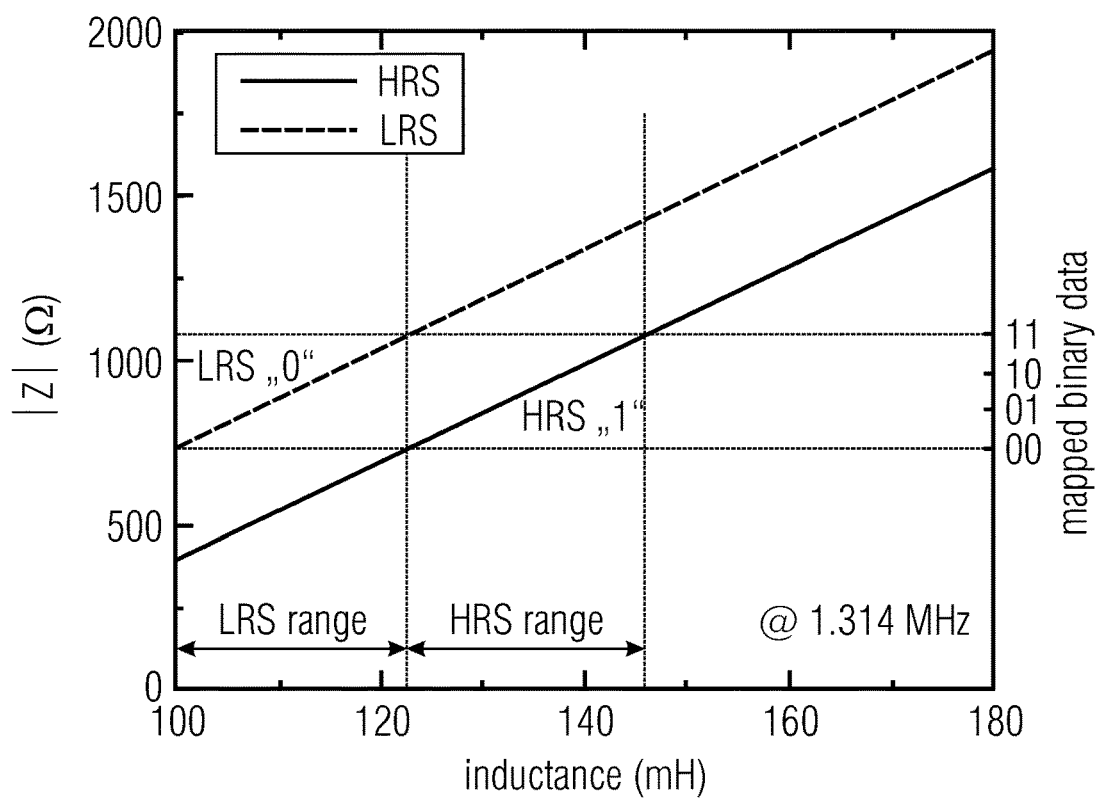
FIG. 12 shows a map of binary data in the LRS state and the HRS state for different inductances at 1,314 MHz.
Figure 13:
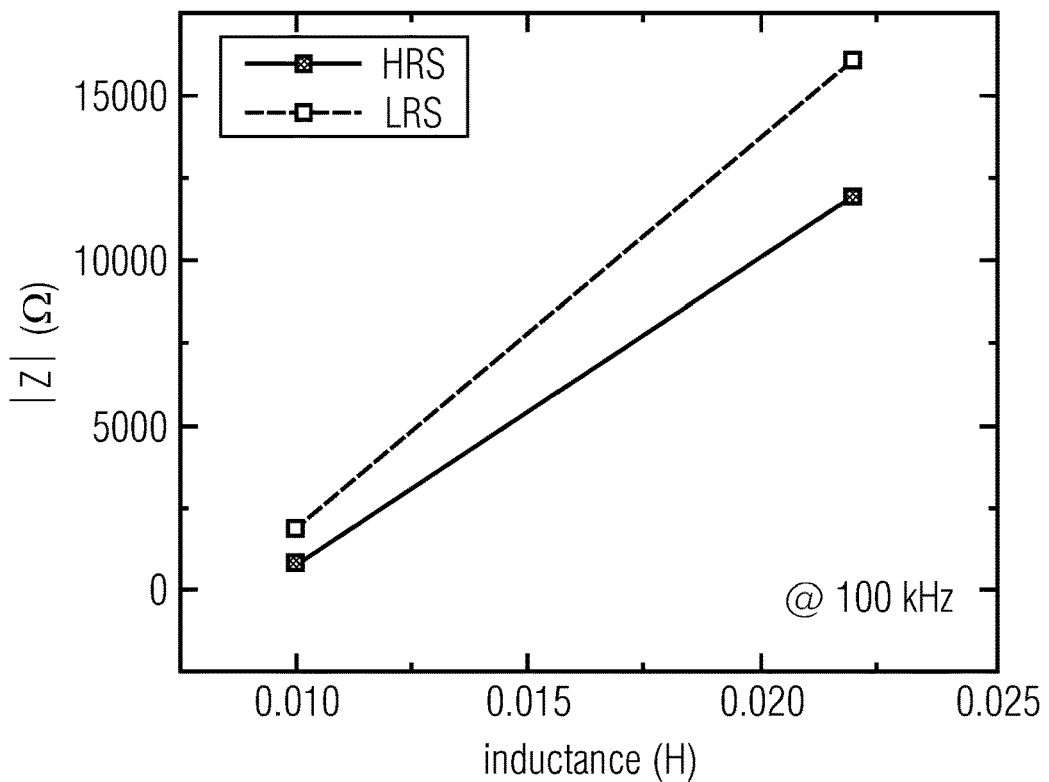
FIG. 13 shows the impedance data for different inductances at 100 kHz.
Figure 14:
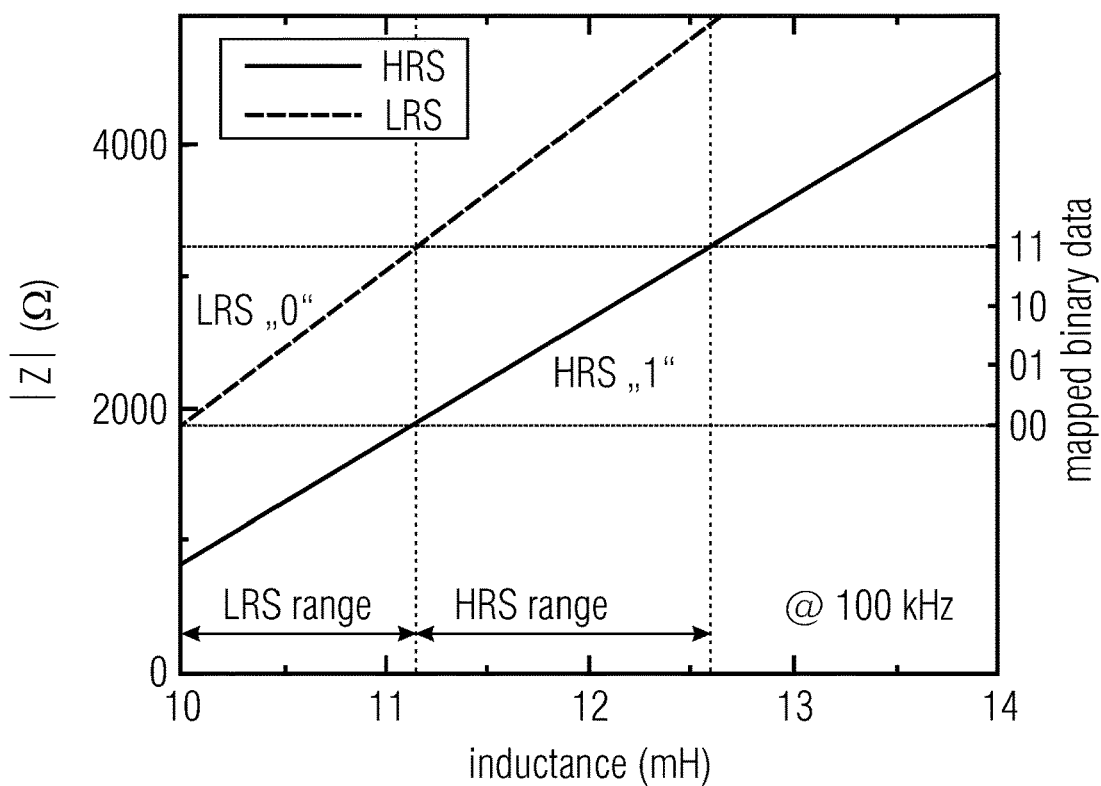
FIG. 14 shows the impedance data for different inductances at 100 kHz.

Thus, when the mempedance element 321 indicates the same inductance value that was used on the encoder side, and comprises the same impedance as the mempedance element 120, the decoder can conclude that the mempedance element 120 was in the HRS state and "1" should be encoded (in the example of FIG. 12).

The mempedance element 322, on the other hand, is permanently in the LRS state.

When the mempedance element 322 indicates the same inductance value that was used on the encoder side, and comprises the same impedance as the mempedance element 120, the decoder can conclude that the mempedance element 120 was in the LRS state and "0" should be encoded (in the example of FIG. 12).

Two comparison units 341, 342 each perform the comparison between the impedance value generated on the decoder side and the impedance value received from the encoder.

In FIG. 5, the binary mapped impedance values are compared with each other. Thus, on the encoder side, the actual impedance value is binary mapped by a binary mapping device 150 (for example, to the values "00", "01", "10" and "11"). On the decoder side, the corresponding mapping is performed by the binary mapping devices 351 and 352, and the binary mappings of the impedance values are compared by the comparison units 341 and 342.

However, in alternative embodiments, the actual impedance value can instead be determined from the transmitted binary mapping of the impedance value received from the decoder. In this case, the actual impedance values can be compared in the comparators 341 and 342 and the binary mapping devices 351 and 352 can be omitted.

It is also possible to transfer the (approximately actual) impedance values from the encoder to the decoder. In this case, too, the binary mapping devices 351 and 352 can be omitted; likewise the binary mapping device 150 on the encoder side.

It should be noted, however, that the impedance value can also comprise a value that is inadmissible. In FIG. 12, this is the value range greater than approx. 1080Ω and less than approx. 750Ω. In this case, no data value of the input data to be transmitted is transmitted with the received impedance value and the corresponding impedance value is ignored by the decoder.

In FIGS. 11 and 12 and FIGS. 13 and 14, the frequencies 1,314 MHz (FIG. 11 and FIG. 12) and 100 kHz (FIGS. 13 and 14) indicate a frequency of the change of the inductance values from the inductance sequence generator 130.

In the following, general embodiments of the invention will be illustrated.

Figure 1:
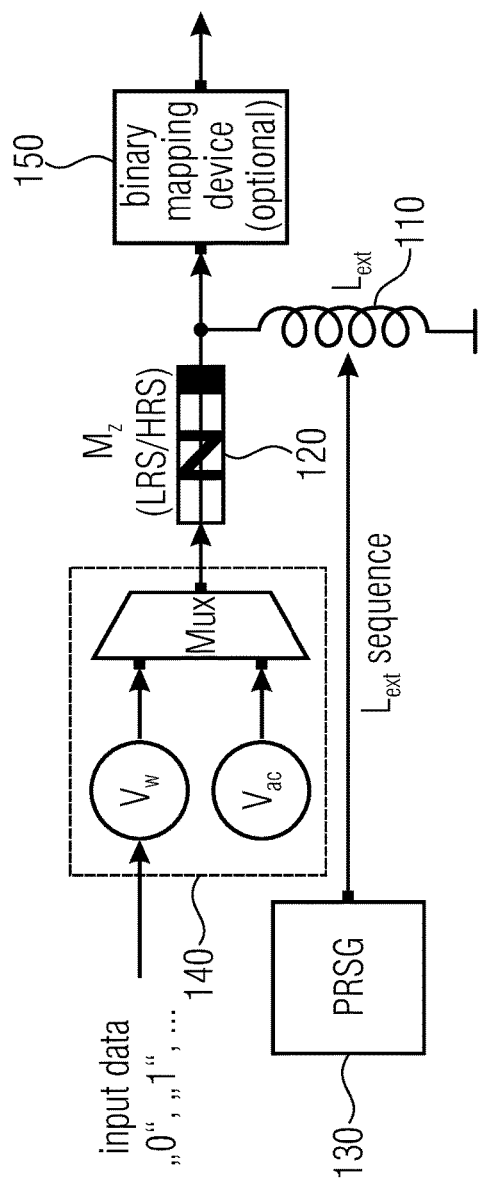
FIG. 1 shows an encoder according to an embodiment.

Thus, FIG. 1 shows an encoder for encoding a binary data sequence according to an embodiment.

The encoder includes an inductance element 110 comprising an adjustable inductance.

Further, the encoder includes a switchable element 120 configured to be switched to a first state (e.g., LRS state) or to a second state (e.g. HRS state), wherein when the inductance element 110 comprises an inductance with a first inductance value, the switchable element 120 comprises a first impedance when the switchable element 120 is switched to the first state, and wherein when the inductance element 110 comprises the inductance with the first inductance value, the switchable element 120 has a second impedance that differs from the first impedance when the switchable element 120 is switched to the second state.

Further, the encoder includes an inductance sequence generator 130 configured to generate an inductance sequence including a plurality of inductance values and to adjust each inductance value of the plurality of inductance values of the inductance sequence at the inductance element 110.

Further, the encoder includes a control unit 140.

The control unit 140 is configured to switch the switchable element 120 to the first state or the second state depending on a binary value of the binary data sequence when the impedance that the switchable element 120 comprises is within a predefined impedance range after one of the inductance values of the plurality of inductance values of the inductance sequence has been adjusted; and Further, the control unit 140 is configured not to switch the switchable element 120 and to maintain the same in the first or second state when the impedance that the switchable element 120 comprises is within the predefined impedance range after the one of the inductance values of the plurality of inductance values of the inductance sequence has been adjusted.

In one embodiment, the switchable element 120 can comprise, for example, yttrium manganese oxide.

According to an embodiment, the encoder can further comprise, e.g., a binary mapping device 150 configured to binary encode a plurality of impedances that the switchable element 120 comprises each after the plurality of inductance values of the inductance sequence have each been adjusted at the inductance element 110 to obtain a plurality of binary encoded impedance values.

Figure 2:
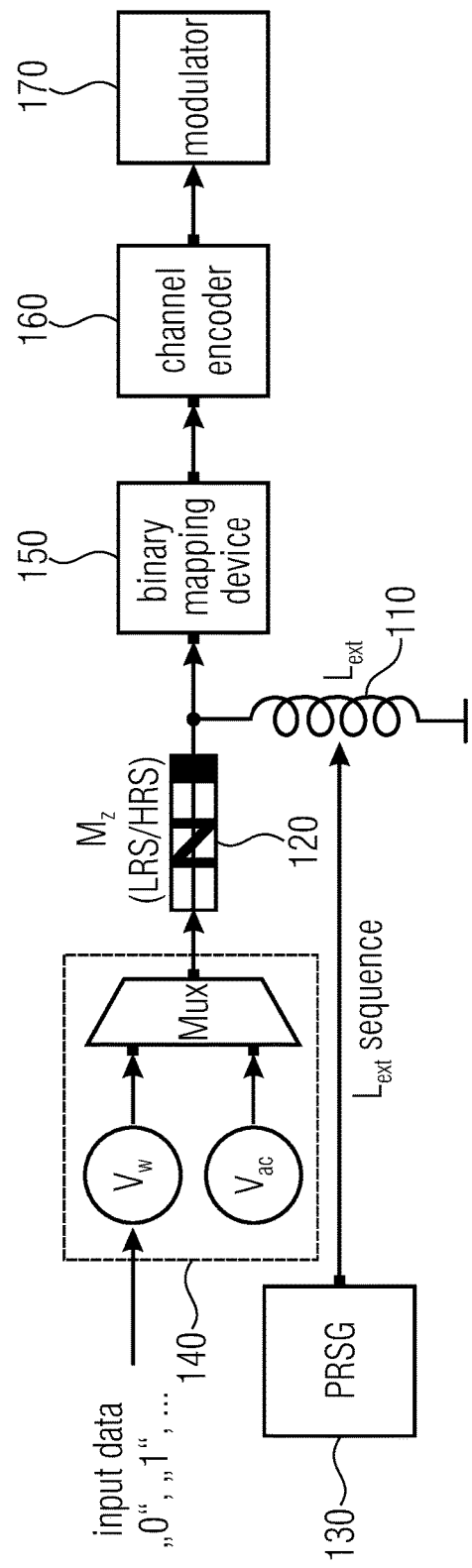
FIG. 2 shows an encoder according to a further embodiment.

FIG. 2 shows an encoder according to a further embodiment.

In FIG. 2, the encoder further includes a channel encoder 160 configured to channel encode the plurality of binary encoded impedance values to obtain a channel encoded signal.

In FIG. 2, the encoder further includes a modulator 170 configured to modulate the channel encoded signal to obtain a modulated signal.

Figure 3:
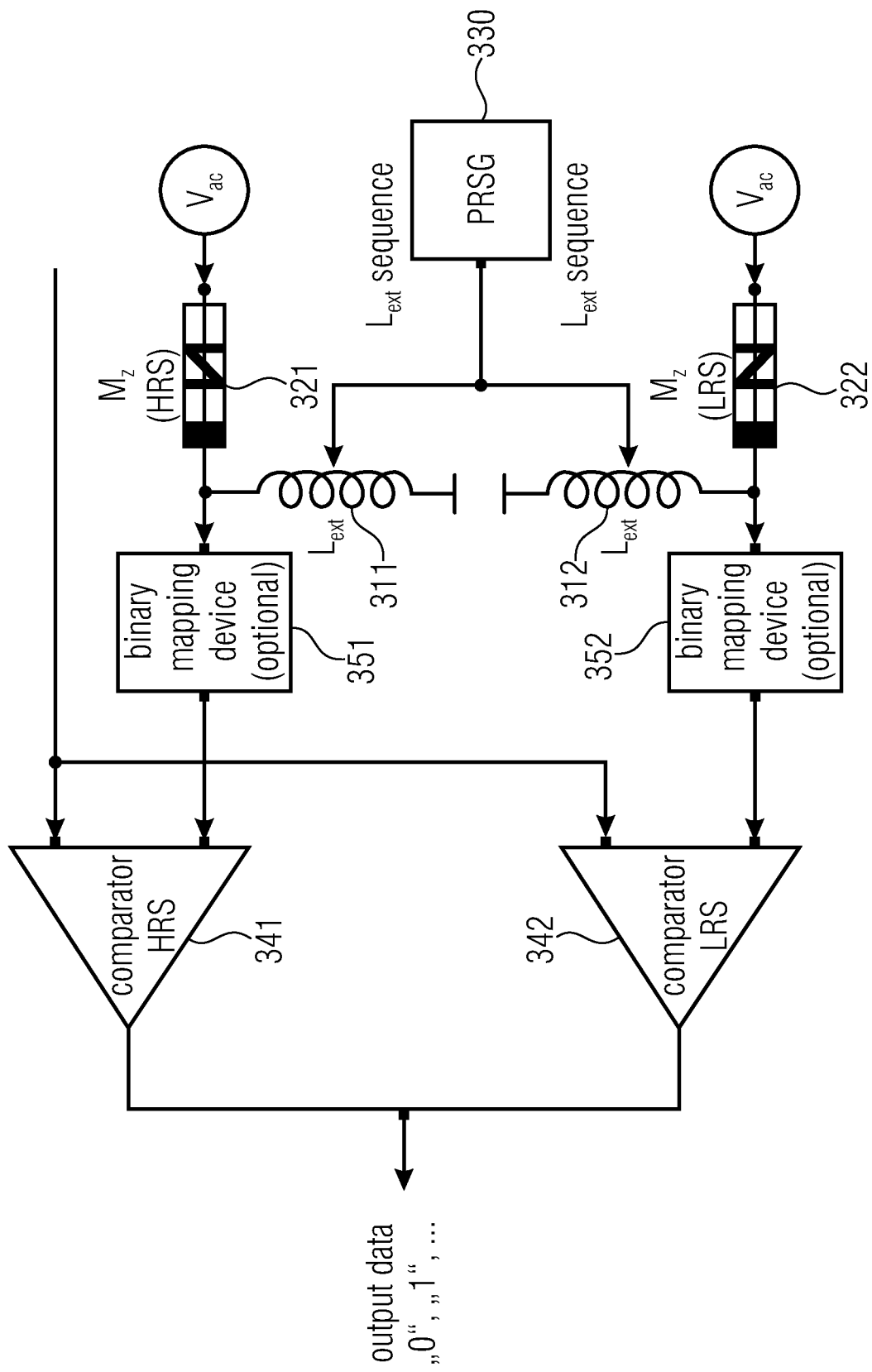
FIG. 3 shows a decoder according to an embodiment.

FIG. 3 shows a decoder for decoding to obtain a binary data sequence, according to an embodiment.

The decoder includes a first inductance element 311 comprising an adjustable inductance.

Further, the decoder includes a first state element 321 configured to comprise a first impedance when the first inductance element 311 comprises an inductance with a first inductance value, and to comprise a second impedance that differs from the first impedance when the first inductance element 311 comprises an inductance with a second inductance value that differs from the first inductance value.

Further, the decoder includes a second inductance element 312 comprising an adjustable inductance.

Further, the decoder includes a second state element 322 configured to comprise a third impedance that differs from the first impedance when the second inductance element 312 comprises an inductance with the first inductance value, and to comprise a fourth impedance that differs from the second impedance and from the third impedance when the second inductance element 312 comprises an inductance with the second inductance value.

Further, the decoder includes an inductance sequence generator 330 configured to generate an inductance sequence including a plurality of inductance values and to adjust each inductance value of the plurality of inductance values of the inductance sequence at the first inductance element 311 and at the second inductance element 312.

Further, the decoder includes a first comparison unit 341 configured to perform a first comparison after a current inductance value of the plurality of inductance values of the inductance sequence has been adjusted at the first inductance element 311, wherein the first comparison depends on a received impedance value and depends on an impedance that the first state element 321 comprises when the current inductance value has been adjusted at the first inductance element 311.

Further, the decoder includes a second comparison unit 342 configured to perform a second comparison after the current inductance value of the plurality of inductance values of the inductance sequence has been adjusted at the second inductance element 312, wherein the second comparison depends on the received impedance value and depends on an impedance that the second state element 322 comprises when the current inductance value has been adjusted at the second inductance element 312.

The decoder is configured to output no binary value of the binary data sequence as a result of the evaluation of the received impedance value, if it results from the received impedance value that no binary value of the binary data sequence is encoded with the received impedance value.

Further, when it results from the received impedance value that a binary value of the binary data sequence is encoded with the received impedance value, the decoder is configured to output a first binary value as a binary value of the binary data sequence as a result of the evaluation of the received impedance value if the first comparison provides a match.

Further, when it results from the received impedance value that a binary value of the binary data sequence is encoded with the received impedance value, the decoder is configured to output, as the result of the evaluation of the received impedance value, a second binary value as said one binary value of the binary data sequence that differs from the first binary value when the first comparison does not provide a match but when the second comparison does provide a match.

In one embodiment, the first state element can comprise, for example, yttrium manganese oxide, and the second state element can comprise, for example, yttrium manganese oxide.

According to another embodiment, the received impedance value can be, for example, a binary encoded received impedance value of a plurality of binary encoded impedance values.

In this regard, the decoder can further comprise, for example, a first binary encoder 351 that can be configured to binary encode the impedance that the first state element 321 comprises when the current inductance value has been adjusted at the first inductance element 311 as a first binary encoded impedance value.

In this regard, the decoder can further comprise, e.g., a second binary encoder 352 that can be configured to binary encode the impedance that the second state element 322 comprises when the current inductance value has been adjusted at the second inductance element 312 as a second binary encoded impedance value.

In this regard, the first comparison unit 341 can be configured, e.g., to perform the first comparison as a comparison of the binary encoded received impedance value with the first binary encoded impedance value.

Further, the second comparison unit 342 can be configured, e.g., to perform the second comparison as a comparison of the binary encoded received impedance value with the second binary encoded impedance value.

Figure 4:
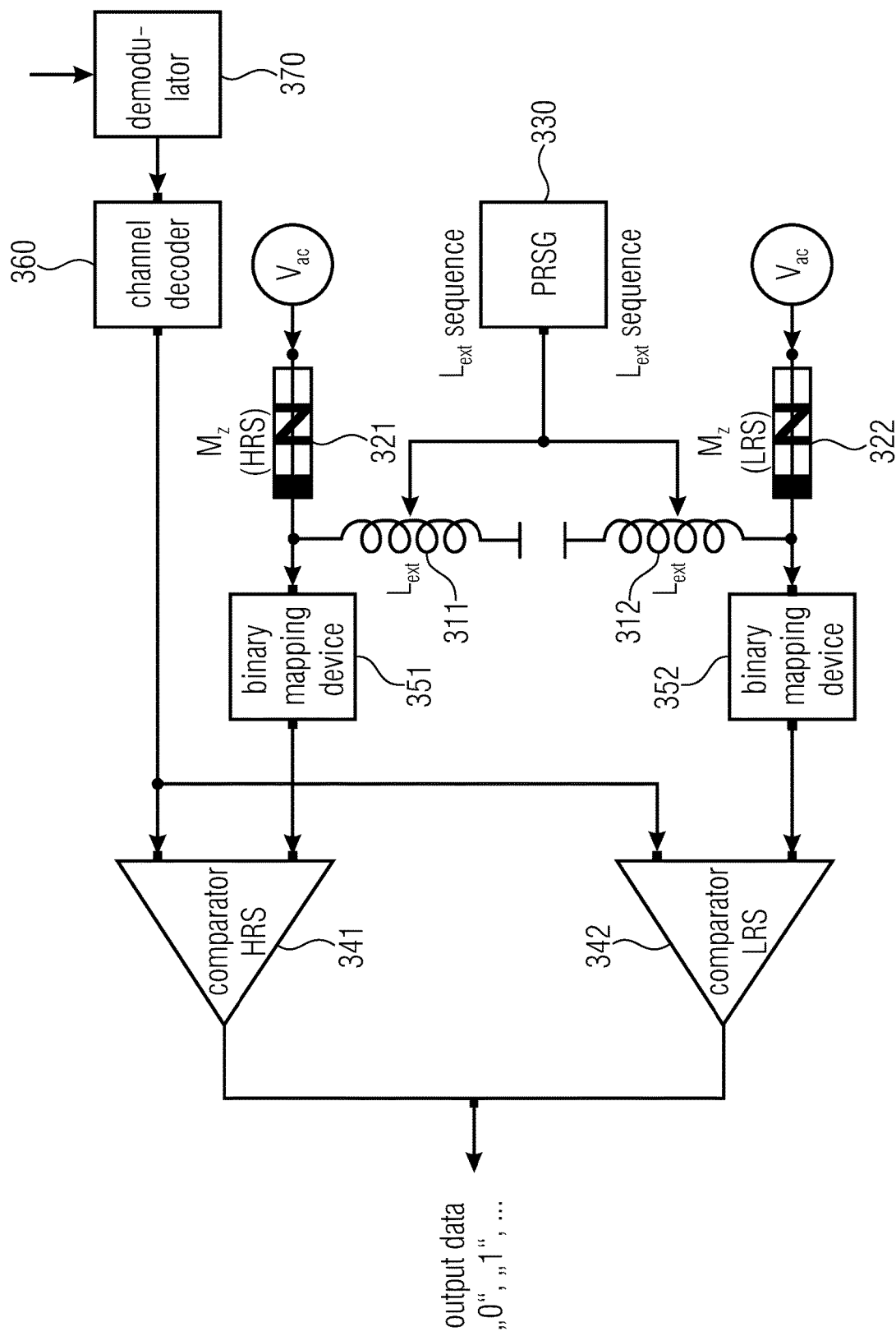
FIG. 4 shows a decoder according to a further embodiment.

FIG. 4 shows a decoder according to a further embodiment.

In FIG. 4, the decoder further includes a channel decoder 360 configured to decode a channel encoded signal to obtain the plurality of binary encoded impedance values.

Further, the decoder in FIG. 4 includes a demodulator 370 configured to demodulate a modulated signal to obtain the channel encoded signal.

FIG. 5 shows a system according to one embodiment. The system of FIG. 5 includes the encoder of FIG. 2 described above and the decoder of FIG. 4 described above. The encoder is configured to encode a binary data sequence and to transmit the same in encoded form to the decoder. The decoder is configured to decode the encoded form of the binary data sequence in order to decode the binary data sequence.

In one embodiment, the switchable element 120 includes a rare-earth manganate.

In a specific embodiment, the switchable element 120 comprises, e.g., yttrium manganese oxide.

In one embodiment, the first state element 321 comprises a rare-earth manganate, e.g. yttrium manganese oxide, and/or the second state element 322 comprises a rare-earth manganate, e.g. yttrium manganese oxide.

In a specific embodiment, the first state element 321 comprises, e.g., yttrium manganese oxide, and/or the second state element 322 comprises yttrium manganese oxide.

In one embodiment, the first state element 321 can be configured as a non-volatile impedance switch and/or the second state element 322 can be configured as a non-volatile impedance switch.

DE 10 2018 112 605 A1 describes a nonvolatile impedance switch reconfigured according to a method for reconfiguring a vortex density. The nonvolatile impedance switch includes a layer sequence consisting of at least one layer of a rare-earth manganate, and a first contact arranged on one side of the rare-earth manganate, and a second contact arranged on the opposite side of the first contact or on the same side as the first contact, as well as insulation structures for time-controlled heat dissipation and for adjusting a temperature gradient during a passage of an ordering temperature of the rare-earth manganate (see DE 10 2018 112 605 A1, paragraph [0015]).

In one embodiment, the switchable element 120 of the encoder can be configured like the non-volatile impedance switch of DE 10 2018 112 605 A1, paragraph [0015].

In one embodiment, the first state element 321 and/or the second state element 322 of the decoder can each be configured like the non-volatile impedance switch of DE 10 2018 112 605 A1, paragraph [0015]. In this regard, for example, the non-volatile impedance switch forming the first state element can be permanently switched to a first state, and for example, the non-volatile impedance switch forming the second state element can be permanently switched to a second state that differs from the first state.

Here, one embodiment relates to a non-volatile impedance switch defined in DE 10 2018 112 605 A1, paragraph [0016].

Here, another embodiment uses a layer of a rare-earth manganate as described in DE 10 2018 112 605 A1, paragraph [0017].

In further embodiments, the non-volatile impedance switch comprises any of the configurations described in DE 10 2018 112 605 A1, paragraph [0018]-[0023].

In embodiments, the non-volatile impedance switch is formed as shown in any of FIGS. 1a, 1b, 1c, 2a and 2b of DE 10 2018 112 605 A1. Exemplary embodiments for the non-volatile impedance switch can be found in DE 10 2018 112 605 A1, paragraph [0026]-[0028].

Further details are described in paragraphs [0029]-[0036] of DE 10 2018 112 605 A1.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps can be performed by a hardware apparatus (or using a hardware apparatus), such as a microprocessor, a programmable computer or an electronic circuit. In some embodiments, some or several of the most important method steps can be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium can be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code can, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals can, for example, be configured to be transferred via a data communication connection, for example via the Internet.

A further embodiment comprises a processing means, for example a computer, or a programmable logic device, configured to or configured to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission can be electronic or optical, for example. The receiver can be a computer, a mobile device, a memory device or a similar device, for example. The apparatus or the system can include a file server for transmitting the computer program to the receiver, for example.

In some embodiments, a programmable logic device (for example a field programmable gate array, FPGA) can be used to perform some or all of the functionalities of the methods described herein. In some embodiments, a field programmable gate array can cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[Cisco2014] Cisco, The Zettabyte Era: Trends and Analysis, White Paper, (2014).
[U.S. Pat. No. 9,812,640 B2] U.S. Pat. No. 9,812,640 B2, Complementary resistance switch, contact-connected polycrystalline piezo- or ferroelectric thin film layer, method for encrypting a bit sequence, T. You, H. Schmidt, N. Du, D. Burger, I. Skorupa, N. Manjunath, granted Nov. 17, 2017.
[Du2014] Nan Du et al, J. Appl. Phys. 115, 124501 (2014).
[Ascoli2016] A. Ascoli, V. Senger, R. Tetzlaff, N. Du, O. G. Schmidt, and H. Schmidt, "BiFeO3 memristor-based encryption of medical data," Int. Symp. Circ. and Syst. (ISCAS), 2016

The invention claimed is:
1. A decoder for decoding to acquire a binary data sequence, comprising:
   a first inductance element comprising a first adjustable inductance,
   a first state element configured to comprise a first impedance when the first inductance element comprises a first inductance value and to comprise a second impedance that differs from the first impedance when the first inductance element comprises a second inductance value that differs from the first inductance value,
a second inductance element comprising a second adjustable inductance,
a second state element configured to comprise a third impedance that differs from the first impedance when the second inductance element comprises the first inductance value and to comprise a fourth impedance that differs from the second impedance and f rom the third impedance when the second inductance element comprises the second inductance value,
an inductance sequence generator configured to generate an inductance sequence comprising a plurality of inductance values and to adjust each inductance value of the plurality of inductance values of the inductance sequence at the first inductance element and at the second inductance element,
a first comparison unit configured to perform a first comparison after a current inductance value of the plurality of inductance values of the inductance sequence has been adjusted at the first inductance element, wherein the first comparison depends on a received impedance value and on the first impedance or the second impedance that the first state element comprises when the current inductance value has been adjusted at the first inductance element,
a second comparison unit configured to perform a second comparison after the current inductance value of the plurality of inductance values of the inductance sequence has been adjusted at the second inductance element, wherein the second comparison depends on the received impedance value and on the third impedance or the fourth impedance that the second state element comprises when the current inductance value has been adjusted at the second inductance element,
wherein the decoder is configured to output no binary value of the binary data sequence as a result of the first comparison or the second comparison of the received impedance value when the received impedance value is encoded with no binary value of the binary data sequence,
wherein, when the received impedance value is encoded with a binary value of the binary data sequence,
the decoder is configured to output:
a first binary value as the binary value of the binary data sequence as a result of the first comparison or the second comparison of the received impedance value when the first comparison provides a match, and
a second binary value as the binary value of the binary data sequence that differs from the first binary value when the first comparison does not provide a match but when the second comparison does provide a match.

2. The decoder according to claim 1,
wherein the first state element comprises yttrium manganese oxide and
wherein the second state element comprises yttrium manganese oxide.

3. The decoder according to claim 1,
wherein the received impedance value is a binary encoded received impedance value of a plurality of binary encoded impedance values,
wherein the decoder further comprises a first binary encoder configured to binary encode the first impedance or the second impedance that the first state element comprises when the current inductance value has been adjusted at the first inductance element as a first binary encoded impedance value,
wherein the decoder further comprises a second binary encoder configured to binary encode the third impedance or the third impedance that the second state element comprises when the current inductance value has been adjusted at the second inductance element as a second binary encoded impedance value,
wherein the first comparison unit is configured to perform the first comparison as a comparison of the binary encoded received impedance value with the first binary encoded impedance value and
wherein the second comparison unit is configured to perform the second comparison as a comparison of the binary encoded received impedance value with the second binary encoded impedance value.

4. The decoder according to claim 3,
wherein the decoder further comprises a channel decoder configured to decode a channel encoded signal to acquire the plurality of binary encoded impedance values.

5. The decoder according to claim 4,
wherein the decoder further comprises a demodulator configured to demodulate a modulated signal to acquire the channel encoded signal.

6. A system comprising:
an encoder for encoding a binary data sequence, comprising:
an inductance element comprising an adjustable inductance,
a switchable element configured to be switched to a first state or to a second state, wherein, when the inductance element comprises a first inductance value, the switchable element comprises a first impedance when the switchable element is switched to the first state, and wherein, when the inductance element comprises the first inductance value, the switchable element comprises a second impedance that differs from the first impedance when the switchable element is switched to the second state,
an inductance sequence generator configured to generate an inductance sequence comprising a plurality of inductance values and to adjust every inductance value of the plurality of inductance values of the inductance sequence at the inductance element,
a control unit,
wherein the control unit is configured to switch the switchable element to the first state or to the second state or to not switch the switchable element depending on a binary value of the binary data sequence when the first impedance or the second impedance that the switchable element comprises is within a predefined impedance range after one of the plurality of inductance values of the inductance sequence has been adjusted, and
a decoder according to claim 1,
wherein the encoder is configured to encode a binary data sequence and to transmit the binary data sequence in encoded form to the decoder according to claim 1 and
wherein the decoder according to claim 1 is configured to decode the encoded form of the binary data sequence to decode the binary data sequence.

7. The decoder according to claim 1, wherein the first state element comprises a rare-earth manganate and/or wherein the second state element comprises a rare-earth manganate.

8. The decoder according to claim 1,
wherein the first state element is configured as a first non-volatile impedance switch and/or wherein the second state element is configured as a second non-volatile impedance switch.

9. The decoder according to claim 8,
wherein the first state element is configured as the first non-volatile impedance switch and
wherein the second state element is configured as the second non-volatile impedance switch,
wherein the first state element is switched to a first state and wherein the second state element is switched to a second state that differs from the first state.

10. An encoder for encoding a binary data sequence, comprising:
an inductance element comprising an adjustable inductance,
a switchable element configured to be switched to a first state or to a second state, wherein, when the inductance element comprises a first inductance value, the switchable element comprises a first impedance when the switchable element is switched to the first state, and wherein, when the inductance element comprises the first inductance value, the switchable element comprises a second impedance that differs from the first impedance when the switchable element is switched to the second state,
an inductance sequence generator configured to generate an inductance sequence comprising a plurality of inductance values and to adjust every inductance value of the plurality of inductance values of the inductance sequence at the inductance element,
a control unit,
wherein the control unit is configured to switch the switchable element to the first state or to the second state or not to switch the switchable element depending on a binary value of the binary data sequence when the first impedance or the second impedance that the switchable element comprises is within a predefined impedance range after one of the plurality of inductance values of the inductance sequence has been adjusted.

11. The encoder according to claim 10,
wherein the switchable element comprises yttrium manganese oxide.

12. The encoder according to claim 10,
wherein the encoder further comprises a binary mapping device configured to binary encode a plurality of impedances that the switchable element comprises each after the plurality of inductance values of the inductance sequence at the inductance element have each been adjusted to acquire a plurality of binary encoded impedance values.

13. The encoder according to claim 12,
wherein the encoder further comprises a channel encoder configured to channel encode the plurality of the binary encoded impedance values to acquire a channel encoded signal.

14. The encoder according to claim 13,
wherein the encoder further comprises a modulator configured to modulate the channel encoded signal to acquire a modulated signal.

15. The encoder according to claim 10,
wherein the switchable element comprises a rare-earth manganate.

16. The encoder according to claim 10,
wherein the switchable element is configured as a non-volatile impedance switch.

17. A method for decoding to acquire a binary data sequence, comprising:
generating an inductance sequence comprising a plurality of inductance values by an inductance sequence generator,
adjusting each inductance value of the plurality of inductance values of the inductance sequence at a first inductance element and at a second inductance element, wherein the first inductance element comprises a first adjustable inductance and wherein the second inductance element comprises a second adjustable inductance,
performing a first comparison by a first comparison unit after a current inductance value of the plurality of inductance values of the inductance sequence has been adjusted at the first inductance element, wherein the first comparison depends on a received impedance value and on an impedance that a first state element comprises when the current inductance value has been adjusted at the first inductance element,
performing a second comparison by a second comparison unit after the current inductance value of the plurality of inductance values of the inductance sequence has been adjusted at the second inductance element, wherein the second comparison depends on the received impedance value and on an impedance that a second state element comprises when the current inductance value has been adjusted at the second inductance element,
as a result of the first comparison or the second comparison of the received impedance value, outputting no binary value of the binary data sequence when the received impedance value is encoded with no binary value of the binary data sequence,
when the received impedance value is encoded with a binary value of the binary data sequence, as a result of the first comparison or the second comparison evaluation of the received impedance value,
outputting a first binary value as the binary value of the binary data sequence when the first comparison provides a match,
outputting a second binary value as the binary value of the binary data sequence that differs from the first binary value when the first comparison does not provide a match but when the second comparison does provide a match,
wherein the first state element is configured to comprise a first impedance when the first inductance element comprises a first inductance value, and to comprise a second impedance that differs from the first impedance when the first inductance element comprises a second inductance value that differs from the first inductance value, and
wherein the second state element is configured to comprise a third impedance that differs from the first impedance when the second inductance element comprises the first inductance value and to comprise a fourth impedance that differs from the second impedance and from the third impedance when the second inductance element comprises the second inductance value.

18. A method for decoding and encoding, comprising:
a method for encoding a binary data sequence, comprising:
generating an inductance sequence comprising a plurality of inductance values by an inductance sequence generator,
adjusting each inductance value of the plurality of inductance values of the inductance sequence at an inductance element, wherein the inductance element comprises an adjustable inductance, wherein, when the inductance element comprises an inductance with the first inductance value, a switchable element comprises a first impedance when the switchable element is switched to a first state and wherein, when the inductance element comprises the inductance with the first inductance value, the switchable element comprises a second impedance that differs from the first impedance when the switchable element is switched to a second state, wherein, when the first impedance or the second impedance that the switchable element comprises is within a predefined impedance range after one of the plurality of inductance values of the inductance sequence has been adjusted, the switchable element is switched to the first state or to the second state or is not switched by a control unit depending on a binary value of the binary data sequence and the method for decoding according to claim 17, wherein the binary data sequence is encoded according to the method for encoding to acquire an encoded form of the binary data sequence and wherein the encoded form of the binary data sequence is decoded according to the method according to claim 17 to decode the binary data sequence.

19. A non-transitory digital storage medium having a computer program stored thereon to perform a method for decoding and encoding, the method comprising:

a method for encoding a binary data sequence, comprising:

generating an inductance sequence comprising a plurality of inductance values by an inductance sequence generator, adjusting each inductance value of the plurality of inductance values of the inductance sequence at an inductance element, wherein the inductance element comprises an adjustable inductance, wherein, when the inductance element comprises an inductance with a first inductance value, a switchable element comprises a first impedance when the switchable element is switched to a first state and wherein, when the inductance element comprises the inductance with the first inductance value, the switchable element comprises a second impedance that differs from the first impedance when the switchable element is switched to a second state, wherein, when the first impedance or the second impedance that the switchable element comprises is within a predefined impedance range after one of the plurality of inductance values of the inductance sequence has been adjusted, the switchable element is switched to the first state or to the second state or is not switched by a control unit depending on a binary value of the binary data sequence, and a method for decoding according to claim 17, wherein the binary data sequence is encoded according to the method for encoding to acquire an encoded form of the binary data sequence and wherein the encoded form of the binary data sequence is decoded according to the method according to claim 17 to decode the binary data sequence, when said computer program is run by a computer.

20. A method for encoding a binary data sequence, comprising:

generating an inductance sequence comprising a plurality of inductance values by an inductance sequence generator, adjusting each inductance value of the plurality of inductance values of the inductance sequence at an inductance element, wherein the inductance element comprises an adjustable inductance, wherein, when the inductance element comprises an inductance with a first inductance value, a switchable element comprises a first impedance when the switchable element is switched to a first state and wherein, when the inductance element comprises the inductance with the first inductance value, the switchable element comprises a second impedance that differs from the first impedance when the switchable element is switched to a second state, wherein, when the first impedance or the second impedance that the switchable element comprises is within a predefined impedance range after one of the plurality of inductance values of the inductance sequence has been adjusted, the switchable element is switched to the first state or to the second state or is not switched by a control unit depending on a binary value of the binary data sequence.

21. A non-transitory digital storage medium having a computer program stored thereon to perform a method for decoding to acquire a binary data sequence, the method comprising:

generating an inductance sequence comprising a plurality of inductance values by an inductance sequence generator, adjusting each inductance value of the plurality of inductance values of the inductance sequence at a first inductance element and at a second inductance element, wherein the first inductance element comprises a first adjustable inductance and wherein the second inductance element comprises a second adjustable inductance, performing a first comparison by a first comparison unit after a current inductance value of the plurality of inductance values of the inductance sequence has been adjusted at the first inductance element, wherein the first comparison depends on a received impedance value and on an impedance that a first state element comprises when the current inductance value has been adjusted at the first inductance element, performing a second comparison by a second comparison unit after the current inductance value of the plurality of inductance values of the inductance sequence has been adjusted at the second inductance element, wherein the second comparison depends on the received impedance value and on an impedance that a second state element comprises when the current inductance value has been adjusted at the second inductance element, as a result of the first comparison or the second comparison of the received impedance value, outputting no binary value of the binary data sequence when the received impedance value is encoded with no binary value of the binary data sequence, when the received impedance value is encoded with a binary value of the binary data sequence:

outputting a first binary value as the binary value of the binary data sequence when the first comparison provides a match, and outputting a second binary value as the binary value of the binary data sequence that differs from the first binary value when the first comparison does not provide a match but when the second comparison does provide a match, wherein the first state element is configured to comprise a first impedance when the first inductance element comprises a first inductance value, and to comprise a second impedance that differs from the first impedance when the first inductance element comprises a second inductance value that differs from the first inductance value, and wherein the second state element is configured to comprise a third impedance that differs from the first impedance when the second inductance element comprises an inductance with the first inductance value and to comprise a fourth impedance that differs from the second impedance and from the third impedance when the second inductance element comprises an inductance with the second inductance value, when said computer program is run by a computer.

22. A non-transitory digital storage medium having a computer program stored thereon to perform a method for encoding a binary data sequence, the method comprising:

generating an inductance sequence comprising a plurality of inductance values by an inductance sequence generator, adjusting each inductance value of the plurality of inductance values of the inductance sequence at an inductance element, wherein the inductance element comprises an adjustable inductance, wherein, when the inductance element comprises an inductance with a first inductance value, a switchable element comprises a first impedance when the switchable element is switched to a first state and wherein, when the inductance element comprises the inductance with the first inductance value, the switchable element comprises a second impedance that differs from the first impedance when the switchable element is switched to a second state, wherein, when the first impedance or the second impedance that the switchable element comprises is within a predefined impedance range after one of the plurality of inductance values of the inductance sequence has been adjusted, the switchable element is switched to the first state or to the second state or is not switched by a control unit depending on a binary value of the binary data sequence, when said computer program is run by a computer.

* * * * *